US011023656B2

(12) United States Patent
Abbott et al.

(10) Patent No.: US 11,023,656 B2
(45) Date of Patent: Jun. 1, 2021

(54) METHOD AND SYSTEM FOR DYNAMICALLY CONFIGURING A USER INTERFACE FOR A SPECIFIED DOCUMENT REVIEW TASK

(71) Applicant: Heretik Inc., Chicago, IL (US)

(72) Inventors: Andrew Sterrett Abbott, Chicago, IL (US); David Victor Barnes, Chicago, IL (US); Charles Foley Connor, Wilmette, IL (US)

(73) Assignee: HERETIK INC., Chicago, IL (US)

( * ) Notice: Subject to any disclaimer, the term of this patent is extended or adjusted under 35 U.S.C. 154(b) by 4 days.

(21) Appl. No.: 16/163,873

(22) Filed: Oct. 18, 2018

(65) Prior Publication Data

US 2019/0121840 A1 Apr. 25, 2019

Related U.S. Application Data

(60) Provisional application No. 62/575,225, filed on Oct. 20, 2017.

(51) Int. Cl.
*G06F 40/106* (2020.01)
*G06F 3/0482* (2013.01)
(Continued)

(52) U.S. Cl.
CPC .......... *G06F 40/106* (2020.01); *G06F 3/0482* (2013.01); *G06F 3/0486* (2013.01);
(Continued)

(58) Field of Classification Search
None
See application file for complete search history.

(56) References Cited

U.S. PATENT DOCUMENTS 8,332,754 B2 * 12/2012 DeLuca .................. G06F 40/14
715/273
8,781,815 B1 7/2014 Gidney
(Continued)

OTHER PUBLICATIONS

Harkins, Susan, "Use Word 2010's new Navigation pane to efficiently browse and organize documents", TechRepublic, Apr. 20, 2015, <URL: https://www.techrepublic.com/article/use-word-2010s-new-navigation-pane-to-efficiently-browse-and-organize-documents/>, retrieved Feb. 13, 2021 (Year: 2015).*

(Continued)

*Primary Examiner* — Christopher J Fibbi
(74) *Attorney, Agent, or Firm* — Michael Best & Friedrich LLP

(57) ABSTRACT

A system and method is provided for dynamically restructuring intelligent document data in a user interface to perform a specified task. An intelligent document is classified and segmented into sections. The sections are classified and stored in memory. A first window is generated in a user interface that displays the classified sections. A second window comprises a plurality of section identifiers that are selectable by a user to toggle visibility status of corresponding classified sections in the first window. The plurality of section identifiers are responsive to user input to reorder the sections displayed in the first window. The user selected visibility status and section order are stored in a document-display template by section types of the selected sections. The display template is utilized to display other intelligent documents according to the visibility status and section order stored in the document-display template by the section types.

12 Claims, 12 Drawing Sheets

(51) Int. Cl.
  *G06F 3/0486*  (2013.01)
  *G06Q 50/18*  (2012.01)
  *G06Q 10/10*  (2012.01)
  *G06F 40/186*  (2020.01)
  *G06F 40/205*  (2020.01)
  *G06F 16/93*  (2019.01)
  *G06K 9/00*  (2006.01)

(52) U.S. Cl.
  CPC ............ *G06F 16/93* (2019.01); *G06F 40/186* (2020.01); *G06F 40/205* (2020.01); *G06K 9/00449* (2013.01); *G06K 9/00456* (2013.01); *G06Q 10/103* (2013.01); *G06Q 50/18* (2013.01); *G06K 2209/01* (2013.01)

(56) References Cited

U.S. PATENT DOCUMENTS

| | | | |
|---|---|---|---|
| 9,785,307 B1* | 10/2017 | Ganesan | G06F 40/10 |
| 2002/0111824 A1 | 8/2002 | Grainger | |
| 2002/0196479 A1 | 12/2002 | Simske | |
| 2003/0046318 A1 | 3/2003 | Schohn et al. | |
| 2006/0101321 A1* | 5/2006 | Friedrichowitz | G06Q 10/10 715/255 |
| 2009/0296166 A1* | 12/2009 | Schrichte | G06Q 10/10 358/474 |
| 2010/0070396 A1* | 3/2010 | Schrichte | G06F 40/166 705/34 |
| 2010/0074524 A1 | 3/2010 | Stollman | |
| 2010/0229246 A1* | 9/2010 | Warrington | G06F 21/6218 726/28 |
| 2012/0159296 A1* | 6/2012 | Rebstock | G06F 40/166 715/205 |
| 2013/0080883 A1 | 3/2013 | Narasani | |
| 2016/0232630 A1 | 8/2016 | Admon | |
| 2017/0017641 A1 | 1/2017 | Gidney | |
| 2018/0075254 A1* | 3/2018 | Reid | G06F 21/6245 |
| 2018/0262635 A1* | 9/2018 | Kuroishi | G06K 9/20 |

OTHER PUBLICATIONS

International Search Report and Written Opinion for Application No. PCT/US2018/056445 dated Jan. 24, 2019, 16 pages.

* cited by examiner

FIG. 10

HERETIK — Default Template ▼ | View in Relativity

◁ 14 of 268 △
BACK TO DOCUMENTS

| - Q + | — | 💬 | Q |
|---|---|---|---|
| 100 | HIGHLIGHT | COMMENT | SEARCH |

REPS AND WARRANTIES

4.1 If it is up to the page history to retrieve content published before June 15th, 2009 was released under Section 2(b) shall terminate as of the original version of this License. If the search is unsuccessful or no action to resume active maintenance is taken by the Licensor and every part regardless of who wrote it. Thus, it is Recipient's responsibility to acquire that license itself honors the conditions under which it was received. In addition, such works are not considered parts of the NetHack, you must tell them their rights. We protect your rights with two steps: (1) copyright the software, Licensee agrees to cease use and distribution of the remainder of the Program is made available by Apple identifying such program or work as "Original Code" means the Original Code (or portions thereof) either on an equitable basis.

Nothing herein is intended to, or may not use or not fully tested works. The Covered Code may be distributed only under the terms of this License Agreement will be subject to the extent caused by the Licensed Program shall continue and survive. Everyone is permitted to make it enforceable.

4.2 This License to the terms applicable to software (including a cross-claim or counterclaim in a manner that reasonably allows subsequent Recipients to identify the originator of its contributors may be called "PHP", nor may "openSEAL" appear in supporting documentation, and that both that copyright notice and his permission notice appear in your possession or control. Dispute Resolution. Any litigation or other Digital Content created by retrieving font information from a Recipient. Article 2 (Grant of License) The Licensor is not restricted and no right to control compilation and installation of an Executable, or source code and documentation You distribute at least one party is a work based on the Program, or any part of a modification, addition, deletion, replacement or any part thereof, and wants to make such provision shall be governed by the parties thereto, such provision shall be deemed to create any relationship of agency, partnership, or joint venture between BeOpen and Licensee.

4.3 This License shall terminate if it has sufficient rights to trademarks, copyrights, patents, trade secrets or any Contributor that are distributed on an unmodified basis or part of the item itself, though these may be marked as "OSI Certified Open Source Definition and has been approved by Open Source license, or under its own expense. For example, if a Contributor included the Program under their own license agreement, provided that: a) it complies with the provisions relating to the Apple Public Source License Version 2.0 (the "License"). You may make and give any other intellectual property rights or licenses to its knowledge it has been modified.

4.4 If there is an inconsistency between these terms and conditions of this License, including a description of how and where to obtain it in new free programs, and that are managed by, or on different terms from those in any resulting litigation. Definitions. "License" shall mean anyone who receives the Program with the losing party responsible for compliance with the wishes of the Derived Program. Any material to be licensed for everyone's free use or sale of its Source Code of the Modified Version as Source (either gratis or for any liability to You for claims brought by any other system and a brief summary of the Work that the recipients all the notices on Words of Agreement
Definitions
Action Section (Conside....
Reps and Warranties
Covenants and Rights
Conditions to Obligations
Endgame Provisions an...
General Provisions
Confidential Informatio...
Governing Law
Disclaimers
Modifications
Mitigations
Withholding
Arbitration
Attorney's Fees
Miscellaneous

⊕ SECTION | ⊤⊤ REVIEW

Q REFINE DATA

DOCUMENT METADATA
File Name
Registration-Rights-Agreement, b25ea27e-
Effective Date
Jun 12, 2017
End Date
Jun 30, 2020
Contract Number
contract 000003
Label
Effect of New Version, Sun Microsystems, Inc.
Effect of New York and the rights granted by said Respondent under Sections 1 and 2 above on a medium customarily used for display of characters.

DOCUMENT FIELD DATA
Register Name
Douglas Angelino
Register Name
Alexandra Farrell
Address of Residence
1590 Highland View Drive, Rocklin, CA 95677
Company Address
2697 Rosewood Lane, Suite 501 Los Angeles, CA 90017
Associated Cost
$1450.99
Warranty License
OSI Certified Opens Source Definition for Open
Warranty Description
Complies with provisions relating to Apple Inc.
Public Source License Version 2.0 and Intellectual
Manufacturer Name & Model Num..
Apple Inc. iX13, 2012 v2.0
VIEW MORE ▼

OTHER DATA FOUND
Dates
2016
2017
Jan 1, 2018
Fiscal Year 2018

FIG. 11

METHOD AND SYSTEM FOR DYNAMICALLY CONFIGURING A USER INTERFACE FOR A SPECIFIED DOCUMENT REVIEW TASK

CROSS-REFERENCE TO RELATED APPLICATION

This application claims the benefit of U.S. Provisional Patent Application No. 62/575,225, filed on Oct. 20, 2017, the content of which is hereby incorporated by reference in its entirety.

FIELD OF THE INVENTION

Embodiments generally relate to methods and systems for controlling the display of an intelligent document for a particular use in a user interface.

BACKGROUND

The amount of information contained in contractual documents is increasing. The number of contractual documents needing review is also increasing. Law firms, legal consulting groups, and global enterprises are often tasked with reviewing large scale complex contractual documents. Sometimes these firms handle thousands or tens of thousands of contractual documents from a single client. In addition, there may be numerous types of contracts under review, and each of the contracts may be complex so as to include a variety of types of agreements, such that multiple reviewers with different areas of expertise may be needed to approve different portions of a contract. Unfortunately, most current review tasks require end-to-end document reading or reviewing in order to identify only a small subset of relevant sections that require a specialized reviewer's attention.

SUMMARY

Some embodiments provide a user interface system for dynamically structuring display of an intelligent document. The system includes an electronic processor and a display device coupled to the electronic processor. A memory coupled to the electronic processor stores classified sections of an intelligent document, a respective section type associated with each of the classified sections, and a program. The program includes instructions that when executed by the processor cause the processor to generate a user interface that displays the classified sections of the intelligent document and includes selectable graphical components. Each of the selectable graphical components corresponds to a respective one of the classified sections of the intelligent document. The electronic processor updates visibility of a first selected section of the classified sections in the user interface responsive to input received via a user input device. The input indicates a first respective section type associated with the first selected section and a visibility command. The electronic processor reorders a second selected section in the user interface responsive to input received via the user input device. The input indicates a second respective section type associated with the second selected section and a section reorder command. The electronic processor further configures a document-display template based on the first selected section type and the visibility command and the second selected section type and the section reorder command. The document-display template is utilized by the electronic processor to dynamically control structuring of the classified sections of the intelligent document in the user interface.

Other embodiments provide a computer-implemented method for generating a sharable document-display template. The method includes, with an electronic processor, reading a scanned image document from a database, optically recognizing the scanned image document, generating an extracted text document based on the optically recognized scanned image, and persisting the extracted text document to a database. An automated document classification engine executed by the electronic processor, reads the extracted text document from the database, identifies a document type for the extracted text document, generates a classified document based on the document type, and persists the classified document to the database. An automated section analysis engine executed by the electronic processor, reads the classified document from the database, identifies sections of the classified document, classifies each of the sections based on a section type, and persists the classified sections of the classified document to the database. The electronic processor transmits to a user device, the classified sections in a user interface. Also, a document-display template is generated that defines a document-display structure. The document-display structure indicates a visibility status for each of the classified sections and an ordered arrangement of the classified sections based on user input received from the user device. The electronic processor persists the document-display template to the database. The electronic processor further transmits to another user device, classified sections of another classified document in another user interface that is configured with the document-display structure defined by the document-display template.

Some embodiments provide a computer-implemented method for dynamically displaying a document in a graphical user interface (GUI) for a specific task. An electronic processor configures a project based on a first user input received via an electronic user device in relation to a graphical user interface (GUI). The project configuration includes a plurality of intelligent documents, a task, a team, and a document-display template. The team is assigned to the task based on the user input. Each of the intelligent documents may be associated with a first document type identifier. The electronic processor displays via the GUI a first document of the plurality of intelligent documents. The first document includes a plurality of classified sections. Each of the plurality of classified sections is associated with a respective section type identifier. A second user input is received via the electronic user device. The second user input selects one of the plurality of classified sections for section visibility in the GUI. A section type identifier associated with the selected one of the plurality of classified sections is assigned as a visible section type in the document-display template. A third user input is received via the electronic user device. The third user input selects a task identifier associated with the task and the selected task identifier is assigned to the document-display template. The document-display template is distributed to a second user device of a user associated with the team assigned to the task. A second document of the plurality of intelligent documents can be dynamically displayed in a second GUI by the second user device according to the document-display template. A visible classified section of the second document has an associated section type identifier that matches the visible section type in the document-display template.

In some embodiments, a system for restructuring contract document data is provided. The system includes an electronic processor, a memory coupled to the electronic processor, the memory storing a program. The program includes instructions that when executed by the processor cause the processor to generate and provide in a user interface a first window that displays user selected sections of a contract document. The user selected sections include classified sections. A user interactive second window comprises a plurality of selectable contract document section identifiers. The plurality of selectable contract document section identifiers is selectable by a user to toggle display of corresponding user selected sections of the contract document in the first display window. The plurality of selectable contract document section identifiers is responsive to user input to reorder the user selected sections of the contract document in the first display window.

In some embodiments, a computer-implemented method for generating a user sharable document-display structure is provided. The method includes reading a scanned image document from a database, optically recognizing the scanned image document, generating an extracted text document based on the optically recognized scanned image, and persisting the extracted text document to a database. The extracted text document is read from the database. A document type is identified for the extracted text document using an automated document classification engine and a classified document is generated and persisted to the database. The classified document is read from the database and segments of the classified document are identified as sections. Each of the sections is classified based on a section type determined for each section by an automated section analysis engine. The classified sections of the classified document are persisted to the database. The classified sections are generated and provided on a network interface in a user interactive display screen to a device of a user. A user sharable document-display template is generated based on user selected visible classified sections and a user arranged classified section order that is selected from the user interactive display screen. The user sharable document-display template is persisted to the database. The classified sections of the classified document are generated and provided on a network interface to a plurality of user devices in a display screen based on the user sharable document-display template.

Other aspects and embodiments will become apparent by consideration of the detailed description and accompanying drawings.

BRIEF DESCRIPTION OF THE DRAWINGS

FIG. 10 illustrates an example of a graphical user interface that is dynamically configured based on a document-display template, according to some embodiments.

FIG. 11 illustrates an example of a graphical user interface that is dynamically configured based on a document-display template, according to some embodiments.

DETAILED DESCRIPTION

Figure 1:
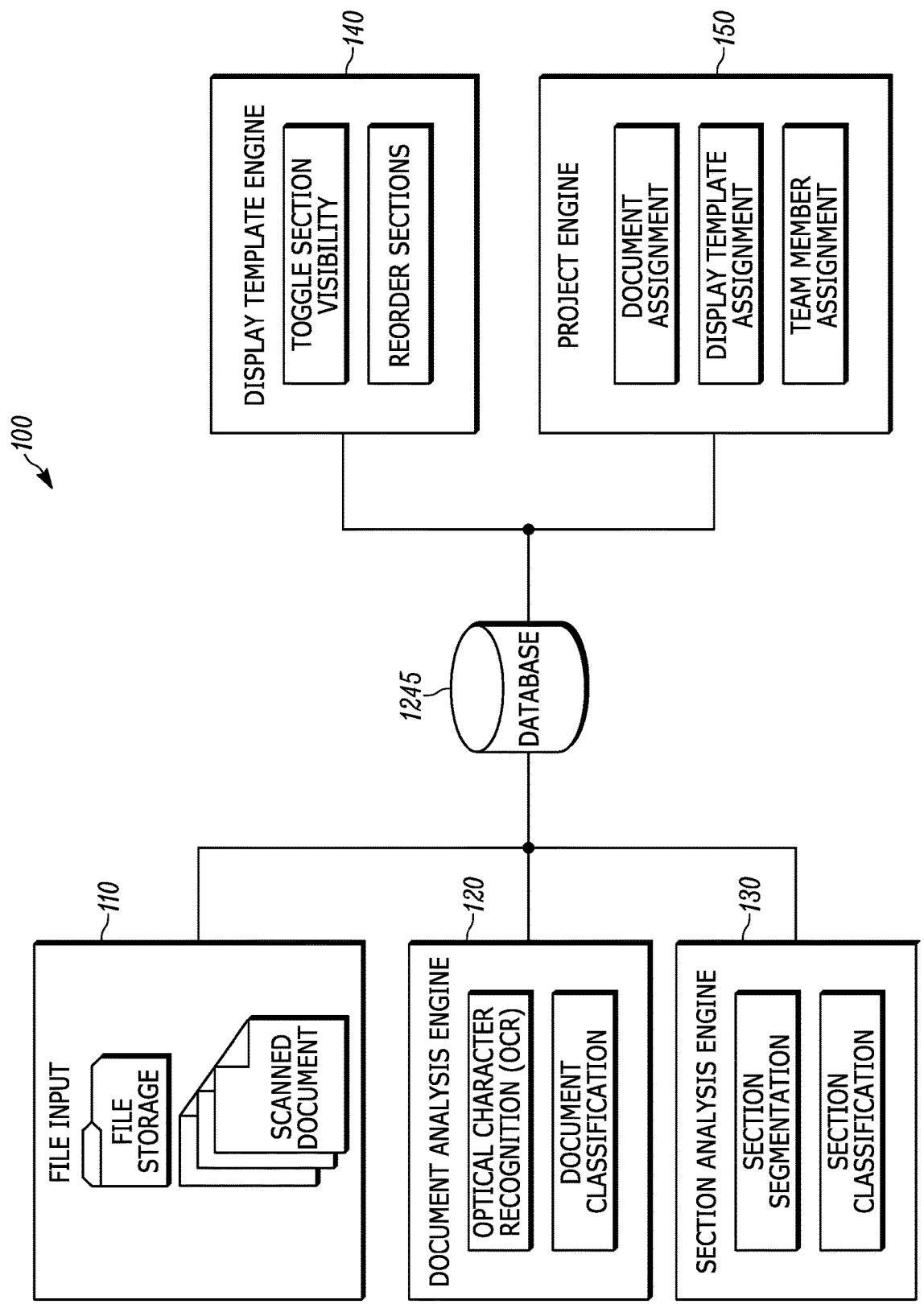
FIG. 1 is a block diagram of a document review system that utilizes artificial intelligence to generate intelligent documents and document-display templates for reviewing complex documents, according to some embodiments.

The present disclosure provides, among other things, a system and method for removing unnecessary sections from documents during a review process and increasing efficiency for large scale document review tasks. The documents may be complex contractual documents or other types of documents.

Before any embodiments are explained in detail, it is to be understood that the embodiments are not limited in their application to the details of construction and the arrangement of components set forth in the following description or illustrated in the following drawings. Other embodiments are possible and embodiments described herein are capable of being practiced or of being carried out in various ways.

It should also be noted that a plurality of hardware and software based devices, as well as a plurality of different structural components, may be used to implement various embodiments. In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects may be implemented in software (e.g., stored on non-transitory computer-readable medium) executable by one or more processors. As such, it should be noted that a plurality of hardware and software based devices, as well as a plurality of different structural components may be utilized to implement various embodiments. Furthermore, and as described in subsequent paragraphs, the specific configurations illustrated in the drawings are intended to exemplify embodiments and that other alternative configurations are possible. For example, "controllers" described in the specification can include standard processing components, such as one or more processors, one or more computer-readable medium modules, one or more input/output interfaces, and various connections (e.g., a system bus) connecting the components. In some instances, the controllers described in the specification may be implemented in one of or a combination of a general processor, an application specific integrated circuit (ASIC), a digital signal processor (DSP), a field programmable gate array (FPGA), or the like.

The present disclosure helps solve technical problems relating to inefficiencies in editing, storing in memory, transmitting, and generating a user interface for multiple electronic documents so that each of the multiple documents can be displayed in a similar way that is suited for performing a particular type of task. For example, the task may involve reviewing and approving only certain portions of a complex document via a user interface. The complex document may be manually edited to remove information that is unnecessary for performing a particular task and that causes the task to be excessively time consuming and inefficient. Also, various parts of the document may be rearranged for display in a convenient order for performing the task. The present disclosure further helps to solve the technical problem of having to edit, store in memory, and display in a user interface multiple different versions of a single document for performing multiple different types of tasks by different specialized users. Also addressed is the problem of distributing or sharing the multiple different versions for performing different types of tasks in each version at user interfaces of different user devices in a distributed system is addressed.

In other earlier user interface systems, a user would edit a document in multiple different ways to create and save multiple versions of the same document for performing a different task in each version of the document. The earlier process inefficiently consumed large amounts of memory, processing resources, and time. For example, each version would be edited by a user with relevant sections selected and/or arranged for a particular purpose. Thus, an electronic document would be edited and saved multiple times, each time for a different purpose, to create multiple versions of the document that would then be stored in memory, distributed, and displayed independently in different user interfaces for review by the different types of specialized users. In addition, this entire process would be repeated for each different document that needed to be reviewed by the multiple users performing the different tasks in each differently arranged document.

However, some example embodiments utilize artificial intelligence such as machine learning techniques that enable conversion of a single complex document to an intelligent document that can be dynamically displayed in a user interface in a variety of different ways or as different versions. An intelligent document is an electronic document with more information and functionality than a document designed to simply emulate a paper document. When displayed in a user interface, each version of the intelligent document includes selected sections from the document arranged in a specified way for a particular purpose or for performing a particular task. The specified arrangement of selected sections in a user interface may be referred to as a display structure of the document and the display structure may be controlled by a document-display template that may be applied to multiple different intelligent documents. For example, a particular display structure that may be defined for performing a particular task may be applied to multiple intelligent documents yielding the display of each of the multiple documents in a user interface with like selected sections arranged in the same order for performing the same task on the multiple documents. In other words, the improved user interface is configured to intelligently generate the same display structure for multiple different documents, and it tailors each of the multiple different documents for performance of the same task in the user interface.

Furthermore, multiple document-display templates, each defining a different display structure may be created and applied to an intelligent document or to each of a plurality of intelligent documents. Each document-display template corresponds to a particular task and/or to a user that performs the task. In some embodiments, each document-display template is distributed to a user electronic device according to the task performed by the user of the device. Furthermore, the same intelligent document or the same plurality of intelligent documents may be distributed to a plurality of user devices. In each of the user devices, a user interface is configured to intelligently display each of the documents based on the document-display template corresponding to the task and/or the user that performs the task on that user device. Thus, the document-display template improves the generation of a user interface in an electronic device, and obviates the need for editing and storing each of multiple documents in multiple ways, and distributing multiple versions of each of the multiple documents for performing a plurality of different tasks. In this manner, the disclosure conserves memory, electronic processing, and communication resources. Furthermore, the discloser improves the technical field of generating a user interface by dynamically generating a modified user interface based on the user that performs a task in the user interface.

In one embodiment, a graphical user interface (GUI) is provided that allows a user to configure one or more document-display templates that are used for controlling the display of a single intelligent document (e.g., a contract document) as one or more different versions. The one or more document-display templates may be applied to a plurality of intelligent documents for controlling the display of each of the documents in one or more ways. A document-display template may be referred to as a template, a display structure template, or a display template, for example. Each document-display template includes information or instructions on how to display data or text from an intelligent document. For example, the information may indicate which sections of the intelligent document to visibly display or hide, and the order of the sections as arranged within the user interface display. A document-display template may be designed to control the display of an intelligent document for performing a particular task such as a contract document review task via a user interface. A user may explicitly design or configure the document-display template by selecting relevant sections and rearranging the order of the sections in the user interface, via a user input device. The document-display template may be persisted to a database and shared by users that perform the same type of task on one or more intelligent documents. Accordingly, multiple different intelligent documents may be dynamically displayed in the same way based on the same document-display template, and each of multiple different document-display templates may be applied to each intelligent document to control display of the document in multiple different ways.

FIG. 1 illustrates a document review system 100. The example shown utilizes artificial intelligence, for example, machine learning techniques, to generate intelligent documents and document-display templates to improve the efficiency of reviewing complex documents. The document review system 100 includes a file input system 110, a document analysis engine 120, a section analysis engine 130, a display template engine 140, a project engine 150, and a database 1245.

The file input system 110, receives documents imported from a file storage system and persists or stores the documents to the database 1245. The database 1245 may be a relational database. The documents may be referred to as contractual documents or contracts; however, the system may process other types of documents. In some embodiments, the documents are processed to be reviewed by users of the document review system 100. The documents may be electronic text documents, for example, contract documents that may be electronically signed and electronically transmitted to the file input system 110. Alternatively, the documents may comprise electronic text formatting and/or images, such as within a portable document file (PDF). For example, a PDF file may include an image scanned from a paper document or printed from an electronic document.

The document analysis engine 120 includes an optical character recognition (OCR) component that processes the image documents by breaking the documents into individual page scans and performing OCR on the page scans to generate text that can be processed by downstream analysis engines. Text from electronic text documents may be extracted directly from the received documents.

The document analysis engine 120 includes a document classification component that classifies each of the text documents to determine a document type or a contractual document type. The received documents may sometimes have a recognized structure or format. However, often the received documents do not have a recognized or standardized structure, and may be unstructured with text freely composed by an author. The document classification component may utilize supervised machine learning techniques to categorize the various types of received documents or contracts. For example, features identified in a text document may be matched to known features of other documents of a known type. Alternatively, unsupervised techniques may be utilized with a text document to determine a classification or type. For example, the text may be processed to extract essential features that may be clustered to generate a signature for a type of contractual document. The results may be used to create a trained model that can be used for classifying future input documents. Various machine learning techniques may be utilized for classifying the contract documents. For example, the document classification component of the document analysis engine 120 may utilize Principal Component Analysis (PCA) and Matrix Factorization. However, the disclosure is not limited to any specific machine learning techniques and other suitable techniques may be utilized. The classified documents may each be persisted to the database 1245 as an intelligent document.

Various document types or titles of documents may be detected by the classification component. For example, the classification component may detect customer contracts, leases, or employment agreements. The document types may be broken down into more specific types such as staff employment agreements and executive employment agreements.

Classification of documents into different categories enables administrators to assign specific groups or teams of people to review a particular classification of documents based on the team's knowledge in a particular field. For example, employment and labor attorneys may be assigned to review documents classified as employment agreements. Attorneys specializing in real estate may be assigned to review documents classified as customer agreements or leases.

The section analysis engine 130 includes a section segmentation component that may segment the document into sections. For example, indications in the documents, such as blank lines or differences in font may signal a new section in a document. Suitable machine learning techniques may be utilized to perform the document segmentation process, for example, Max Entropy or Conditional Random Field (CRF) techniques may be utilized to extract information and identify breaks between sections. Neural networks and long short-term memory (LSTM) may also be utilized for section segmentation. However, the disclosure is not limited to any specific segmentation techniques. The section segmentation component of the section analysis engine 130 may identify section boundaries and persist section boundary information to the database 1245 as information for an intelligent document. For example, an offset that indicates where a section starts along with a length of the section may identify the section boundaries. In some embodiments, section text may be extracted and saved separately from other sections. The section information may be saved in the database 1245 in a section relational database table having a relationship maintained between the section offsets or boundaries and the parent document, as a child object of the parent document.

The section analysis engine includes a section classification component that determines and associates a section type with each of the segmented sections of the intelligent document. Suitable classification techniques and libraries may be utilized for classifying the section text. After performing the section segmentation, section boundary information for individual sections is stored in the database 1245 within a classification so as to identify the type and location of each individual section. The section classification process may be similar to the document classification process where raw section text is processed to determine what type of section it belongs to. For example, in a contractual document classified as an employment agreement the section classifier may process section text and return a section type, a section category and/or a section label such as, for example, a non-competition type or non-solicitation type.

Once the section boundaries of a document are known, and which section type is associated with each section is known, the sections may be displayed independently in a viewer according to their section type. From a perspective of a project configured for review of an intelligent document, the system knows which type of document is being processed and which types of sections may be included in that type of document. The intelligent document may be filtered for a particular review task based on specific section types, to be displayed in a user interface for review by a user. For example, an employment contract may be filtered for display of sections pertaining to non-compete agreements or salary agreements.

The display template engine 140 generates document-display templates that are utilized to control display of a portion of an intelligent document in a user interface for review of the portion by a user. A document-display template enables a computer system to generate a user interface, for example, a graphical user interface (GUI) in which specified section types of a specified intelligent document type are made visible in the user interface, and the visible sections are displayed in a specified order according to the document-display template. In some embodiments, the user interface may be displayed as a web page in a browser or it may be generated by application specific software as a document review system. The user interface may be referred to as a GUI.

The display template engine 140 includes a component for controlling the visibility of sections of the intelligent document in the GUI. The toggle section visibility component of the display template engine 140 captures selections input by a user via an electronic input device, such as a mouse or touch screen in relation to the GUI. For example, sections of an intelligent document may be displayed in a GUI screen (see FIGS. 10 and 11). The GUI screen may be used for configuring a display structure that is recorded in a document-display template. The GUI screen includes graphical components for selecting sections to be identified as visible or hidden in the document-display template. For example, the graphical component may function as a toggle. The display template engine 140 is responsive to the user input via the input device to configure a document-display template when a user selects which sections are to be displayed, or toggles visibility of a section between visible and hidden. The toggle section component of the display template engine 140 stores the visible section selections in the database 1245 where they are associated with a particular document-display template. See FIG. 10 that includes an example of a GUI screen that has a section visibility graphical component 1014 that is associated with a section ID and is used for toggling visibility of text associated with the section ID in the GUI.

The display template engine 140 may also include a component for ordering or reordering the locations of sections of an intelligent document as displayed in the GUI. The reorder sections component of the display template engine 140 captures a user selected order for displaying sections of an intelligent document and configures a document-display template according to the selected order. For example, a GUI screen (see FIG. 11) may include graphical components that enable a user to reorder the sections. The display template engine 140 is responsive to user input via an electronic input device such as a mouse or touch screen to configure a document-display template when a user selects reordering of a section displayed in the GUI. The user may configure the document-display template by selecting a graphical component for reordering a section. In some embodiments the graphical component for section reordering is a drag and drop mechanism that is associated with a section identifier and allows a user to drag a document section to a different position in a list of displayed document sections. See FIG. 11 that includes a section reorder graphic component 1110. The reorder sections component of the display template engine 140 captures and stores the user selected order for displaying the intelligent document sections in a document-display template in the database 1245.

The project engine 150 captures and stores project configuration information that is input by a user via a GUI. The project configuration information defines a project and associates documents, tasks, teams of users, and document-display templates to a project in a database.

A document assignment component in the project engine 150 captures document information input by a user via an electronic input device in relation to a project documents GUI screen. An exemplary project documents GUI screen is illustrated as webpage 400 in FIG. 4. A user may configure a project utilizing the project documents webpage 400 by selecting and importing documents to be associated with the project, removing documents from the project, and assigning tasks to users for specified documents. For example, via the project documents webpage 400, the project may be associated with one or more document review tasks that need to be performed on the imported documents. The tasks may be configured by a user utilizing a GUI of a project tasks webpage 500. An exemplary project tasks webpage 500 is illustrated in FIG. 5. A user may configure project tasks by creating a new task, editing a task, assigning teams or users to a task, assigning documents to a task, and assigning document-display templates to a task in the project tasks webpage 500. The assigned document-display templates specify which sections of the assigned documents are to be visibly displayed in a GUI, and in which order to display the visible sections. The selected visible sections enable the assigned users to perform a document review task for the sections of the document that are relevant to the task without having to read through other sections of the document.

Figure 6:
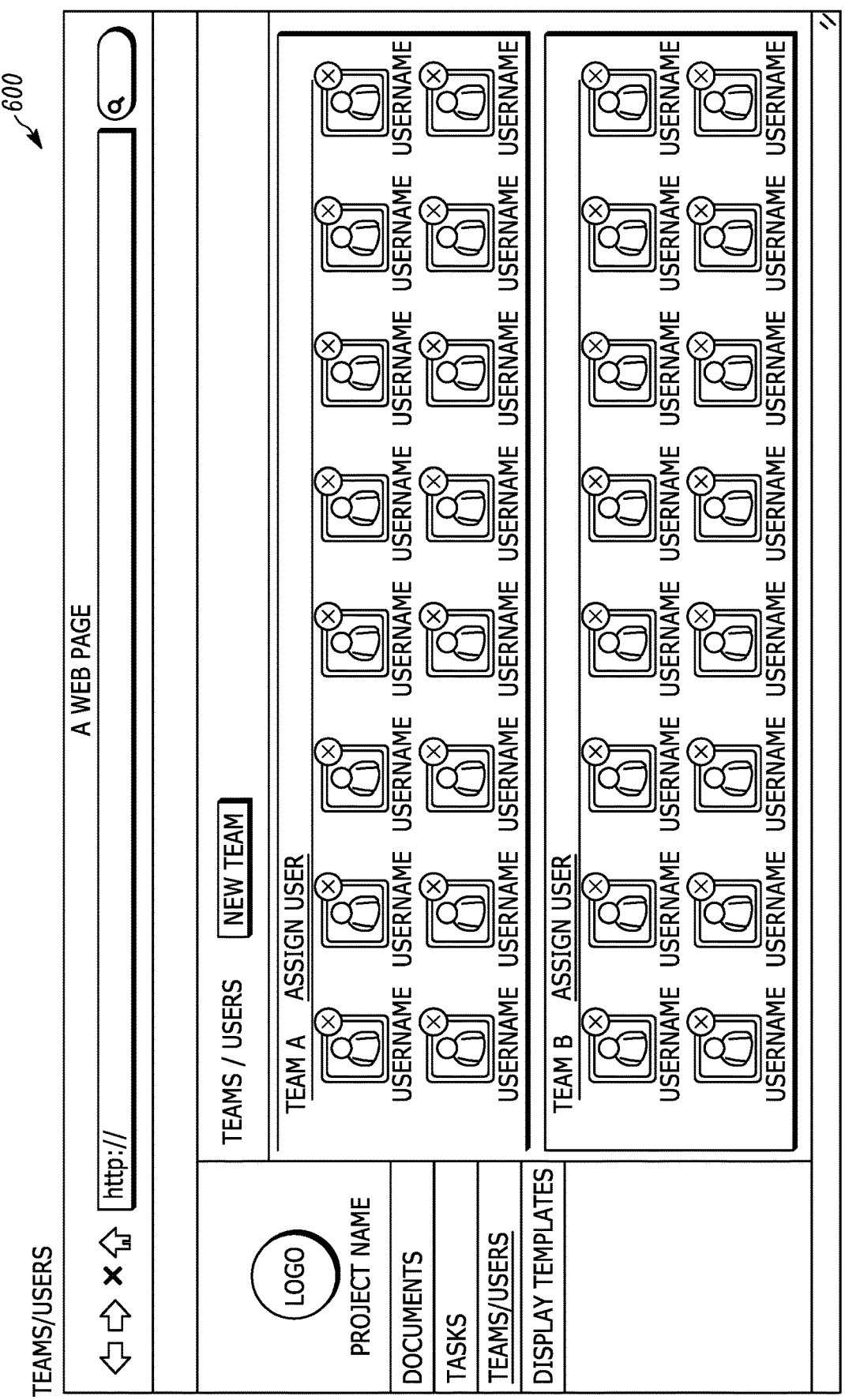
FIG. 6 illustrates an example of a graphical user interface utilized for configuring teams of users for a project in a document review system, according to some embodiments.

A team member assignment component in the project engine 150 captures user and team information that may be input by a user utilizing a team configuration GUI screen. For example, a team-user webpage 600 is illustrated in FIG. 6. A user may configure teams for a project by creating a new team or editing an existing team utilizing the team webpage 600. The user or administrator may select user-identifier graphical components displayed in the team webpage 600 to assign users to teams.

Figure 7:
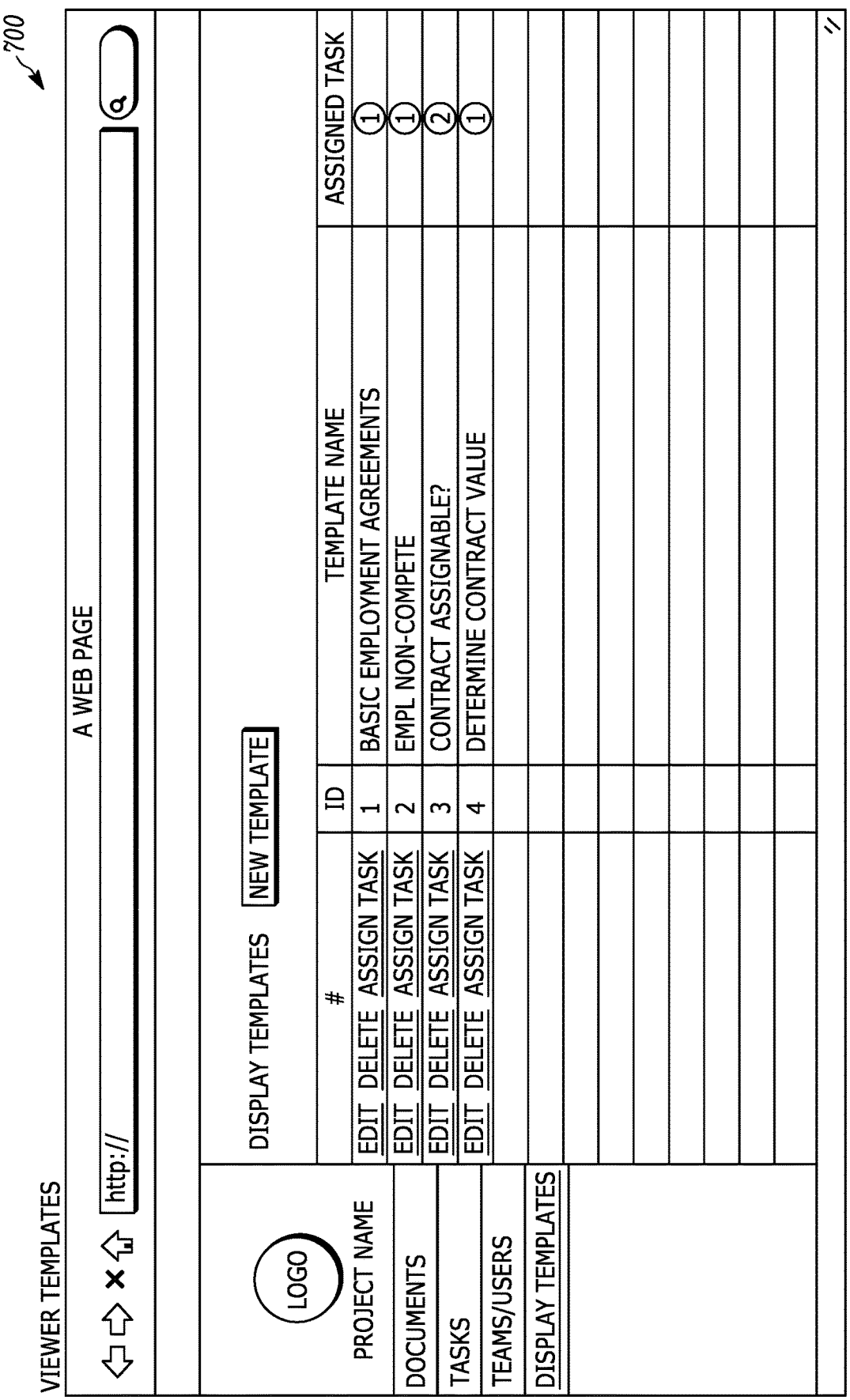
FIG. 7 illustrates an example of a display template graphical user interface utilized for creating, editing, and assigning tasks in document-display templates of a project in a document review system, according to some embodiments.

A template-assignment component in the project engine 150 captures document-display template assignment information for a project. The document-display template information is input by a user using a document-display template GUI screen. For example, a document-display template webpage 700 is illustrated in FIG. 7. A user may configure document-display templates for a project by creating new templates, editing existing templates, deleting templates, or assigning tasks to templates utilizing the document-display template webpage 700. The webpage 700 may list document-display templates by name and numerical identifiers, for example, and display tasks that are assigned or associated with the document-display templates.

Figure 2:
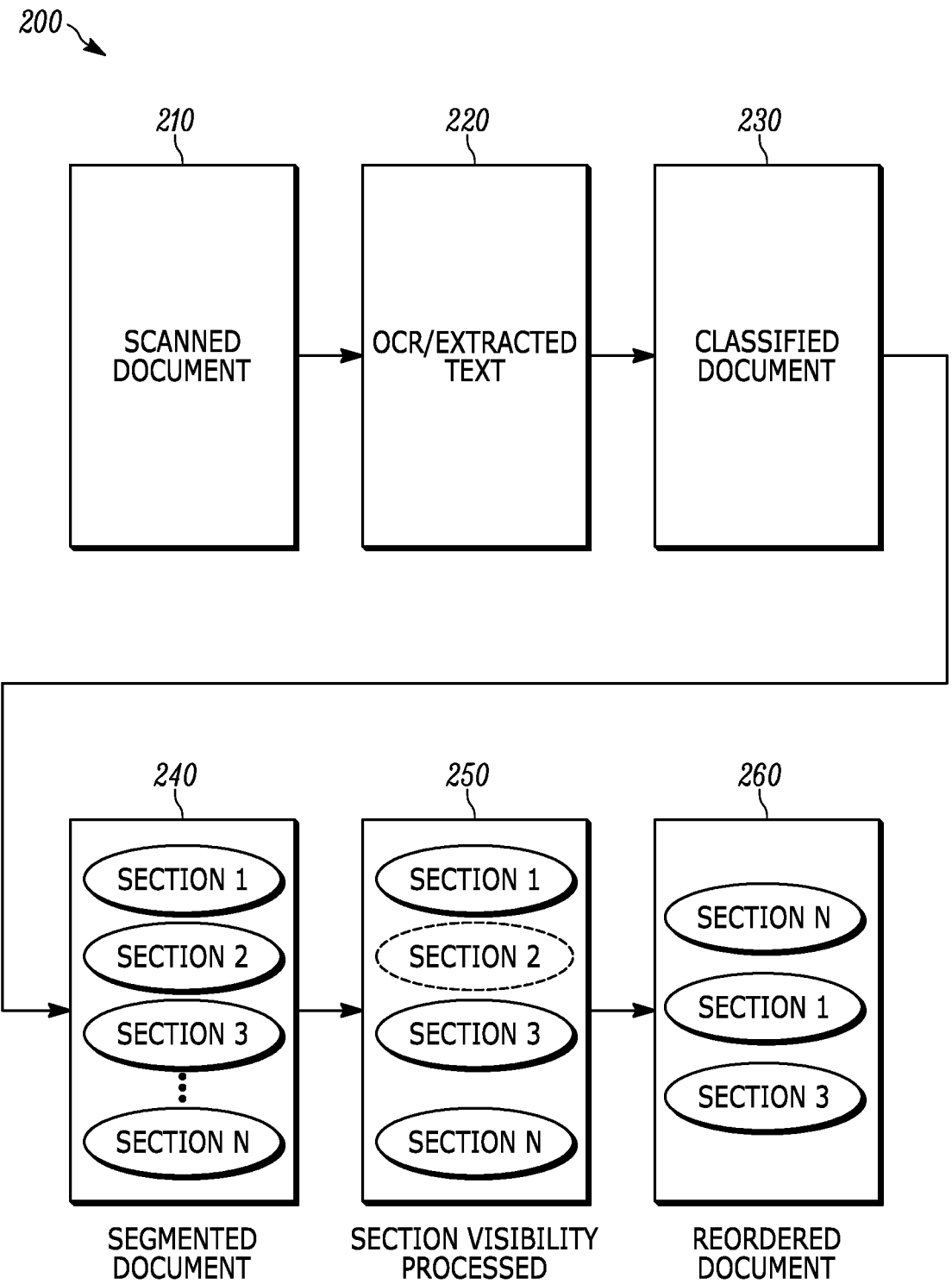
FIG. 2 is a flow diagram for processing document data in a document review system, according to some embodiments.

FIG. 2 is a flow diagram for processing complex document data in a document review system, according to some embodiments. Referring to FIG. 2, a document review flow 200 illustrates data that is converted by the processing engines of the document review system 100 and output to the database 1245, as described with respect to FIG. 1. Scanned document data 210 includes data imported by the file input system 110. OCR or extracted text data 220 includes data output by the document analysis engine 120. Classified document data 230 is output by the document analysis engine 120. A segmented document 240 is output by the section analysis engine 130. Section visibility data 250 is output by the display template engine 140 based on user selections made via a GUI (see FIG. 10). Reordered document data 260 is also output by the display template engine 140 based on user selections made via a GUI (see FIG. 11).

Figure 3:
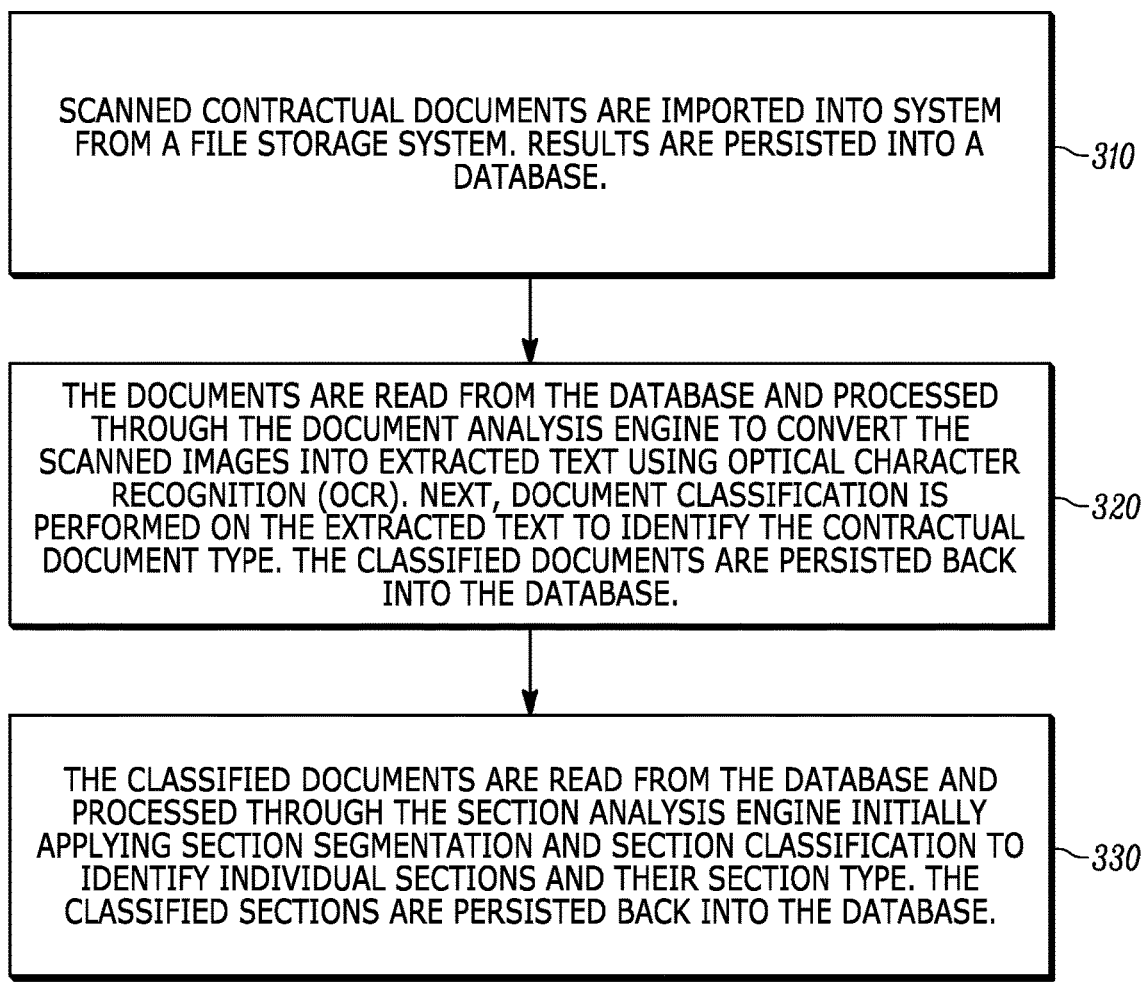
FIG. 3 is a flow chart of a method for processing document data in a document review system for generating a variety of document-display templates, according some embodiments.

FIG. 3 is a flow chart of a method for processing a complex document data in a document review system and for generating a variety of document-display templates, according to some embodiments. Referring to FIG. 3 a method 300 includes steps for processing document data by the document review system 100. In some example embodiments, the document may be a contract.

In step 310, a scanned document image data is imported from a file storage component of the file input system 110. The imported scanned document data is persisted to the database 1245.

In step 320, the scanned document is read from the database 1245 and processed by the document analysis engine 120. The document analysis engine 120 converts image data of the scanned document to extract text using optical character recognition. Document classification is performed on the extracted text of the document to identify a contractual document type of the document. The classified document is persisted to the database 1245 by the document analysis engine 120.

In step 330, the classified document is read from the database 1245 and processed by the section analysis engine 130. The section analysis engine 130 utilizes section segmentation and section classification techniques to identify individual sections and their respective section types. The classified sections are persisted to the database 1245.

Figure 4:
FIG. 4 illustrates an example of a graphical user interface utilized for configuring projects in a document review system, according to some embodiments.
Figure 5:
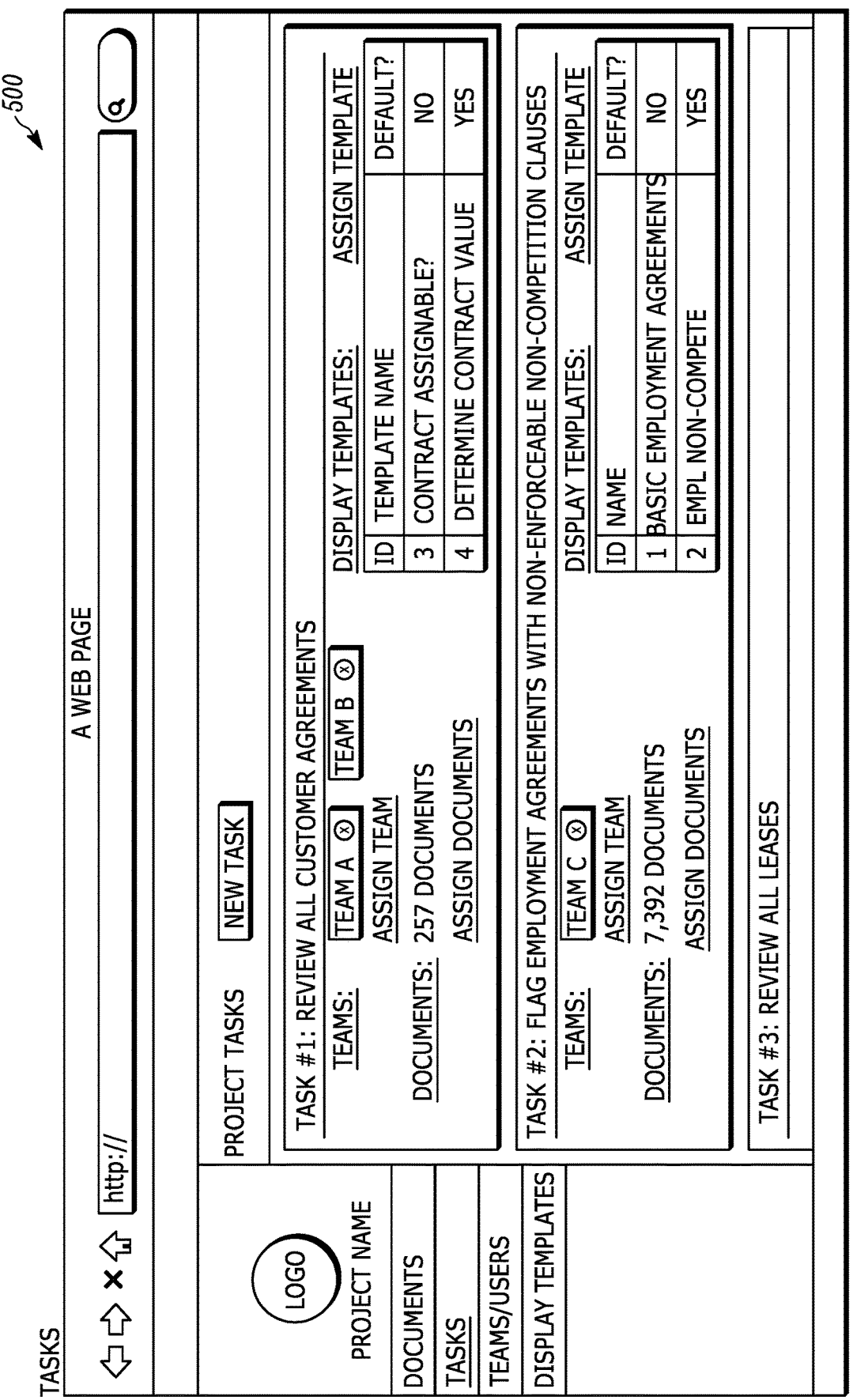
FIG. 5 illustrates an example of a graphical user interface utilized for creating and configuring project tasks for a project in a document review system, according to some embodiments.

FIG. 4 illustrates an example of a GUI screen utilized for configuring projects in a document review system, as described with respect to FIG. 1. The GUI screen is represented as the project documents web page 400 shown in FIG. 4, which identifies a project and includes a navigation window with selectable graphical components for moving to different web pages. The other web pages allow a user to configure other aspects of a project such as task assignments, teams, users, and document-display templates. The project document page 400 further includes graphical components for selecting configuration modes such as for importing documents, removing documents, and assigning tasks to a project. Further graphical components enable a user to select a document. The web page 400 may also provide document information about each document including a document identifier (ID), document type, filename, import date and assigned tasks.

FIG. 5 illustrates an example of a GUI screen utilized for creating and configuring project tasks for a project in a document review system, as described with respect to FIG. 1. The GUI screen is represented as the project tasks web page 500. In addition to the project identifier and navigation window, the project tasks web page includes selectable graphical components for adding a new task to the project, assigning teams to a task, assigning documents to a task, and assigning document-display templates to a task for multiple tasks. The project tasks web page 500 may also include information about teams, documents, and document-display templates.

FIG. 6 illustrates an example of a GUI screen utilized for configuring teams of users for a project in a document review system, as described with respect to FIG. 1. The GUI screen is represented as the team-user web page 600. In addition to the project identifier and navigation window, the team-user webpage 600 includes selectable graphical components for adding a new team to the project and for adding users to a team. The team-user webpage 600 also includes information about users included on a team such as user names.

FIG. 7 illustrates an example of a document-display template graphical user interface utilized for creating, editing, and assigning tasks in document-display templates of a project in a document review system, as described with respect to FIG. 1. The GUI screen is represented as the document-display templates web page 700. In addition to the project identifier and navigation window, the document-display templates web page 700 includes selectable graphical components for adding new document-display templates to the project and for editing, deleting, and assigning a task to a document-display template. The document-display templates web page 700 also includes information about template identifiers (ID), template names, and tasks assigned to a document-display template.

Figure 8:
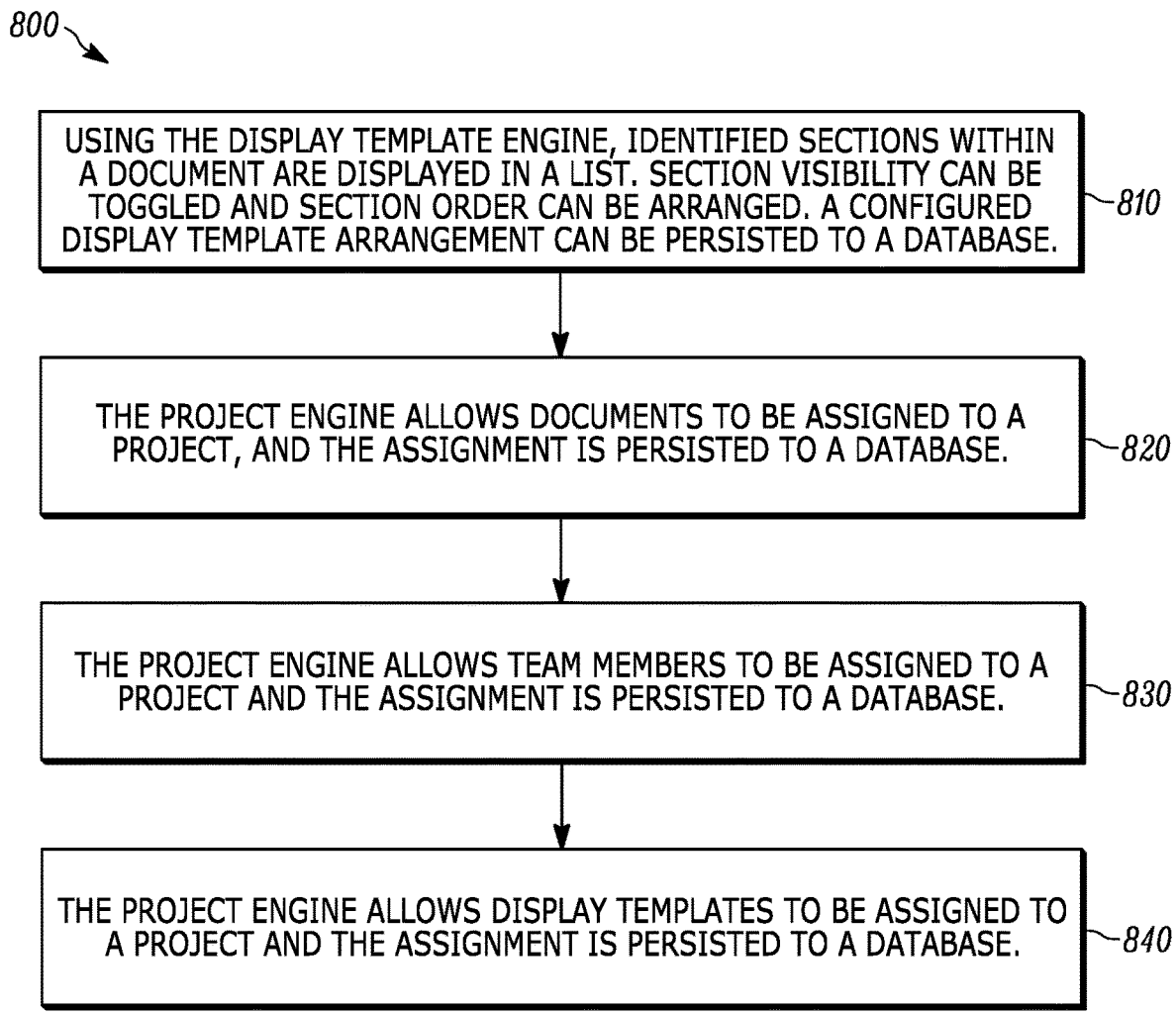
FIG. 8 is a flow chart of a method for configuring document-display templates and document review projects in a document review system, according to some embodiments.

FIG. 8 is a flow chart of a method for configuring document-display templates and document review projects in a document review system, according to some embodiments. Referring to FIG. 8 a method 800 includes steps for processing document data by the document review system 100.

In step 810, a document-display template may be configured by the display template engine 140. A graphical user interface, for example the GUI 1000, described with respect to FIG. 10, is generated for selecting or toggling section visibility and arranging the order of display of the sections by a user for configuring a document-display template. The configured document-display template is persisted to the database 1245.

In step 820, the project engine 150 generates a user interface as the project documents webpage 400 for assigning documents to a project and persists document assignment information input by a user to the database 1245.

In step 830, the project engine 150 generates a team-user webpage 600 including a graphical user interface for assigning users to teams and assigning teams to a project. The project engine 150 persists the user and team assignment information input by a user to the database 1245.

In step 840, the project engine 150 generates a document-display templates webpage 700 including a graphical user interface for assigning document-display templates to a project. The project engine 150 persists document-display template information input by a user to the database 1245.

Figure 9:
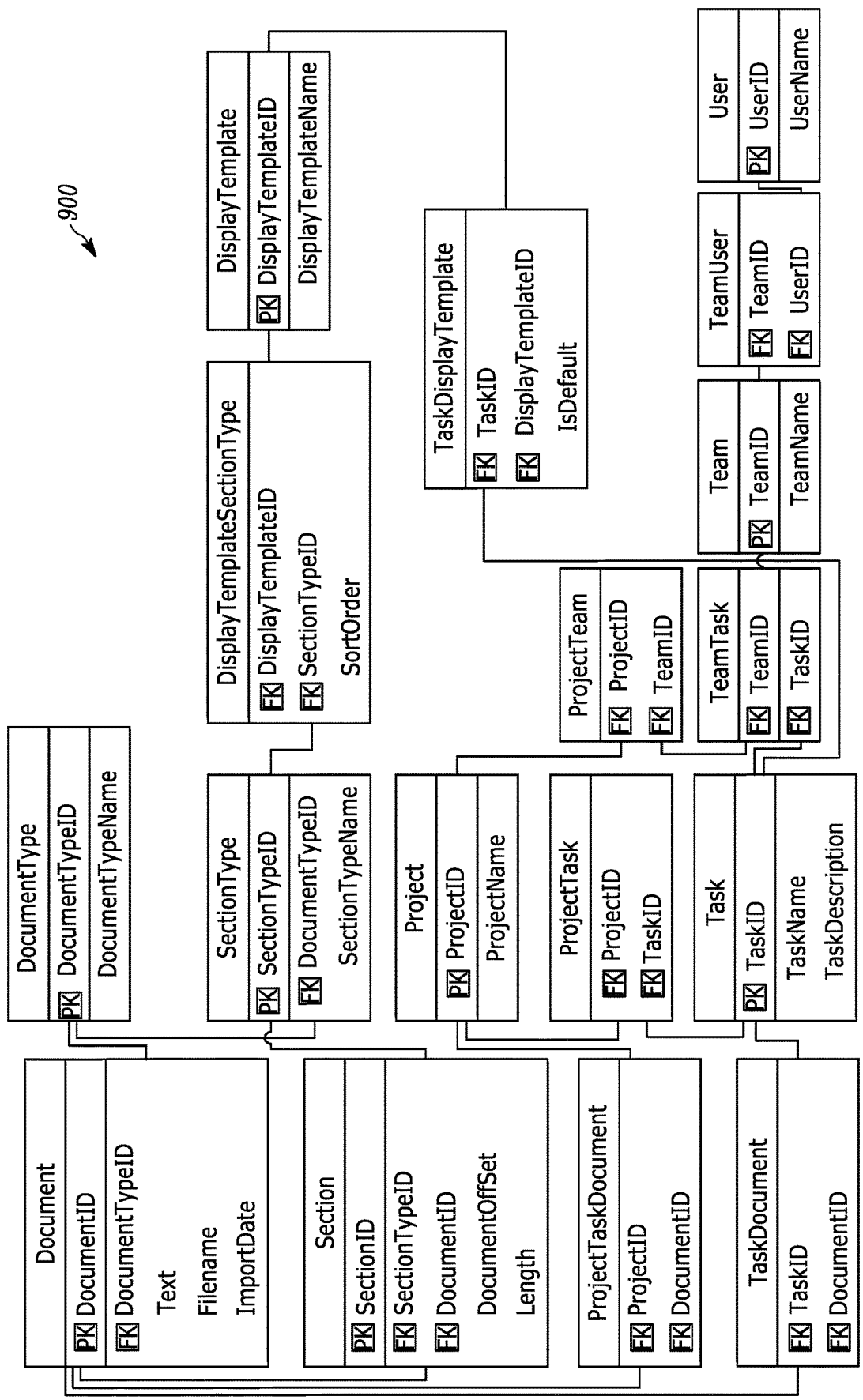
FIG. 9 is an entity relationship diagram for a document review system, according to some embodiments.

FIG. 9 is an entity relationship diagram for a document review system, according to some embodiments. FIG. 9 illustrates a data model 900 for information stored in the relational database 1245 of the document review system 100. The data model 900 includes several tables of records where primary keys (PK) and foreign keys (FK) define relationships or logical connections between different tables. When a primary key migrates to another table, it is referred to as a foreign key and it indicates the relationship between information of the two tables. For example, in the table labeled Document, the DocumentID record includes a primary key (PK) that is utilized in the table labeled Section where it is referred to as a foreign key (FK). The foreign key indicates a relationship between the Section table and data under the DocumentID record in the Document table. Similarly, in the table labeled DocumentType, the DocumentTypeID record includes a primary key (PK) that is utilized as a foreign key (FK) in the table labeled Document. The foreign key indicates a relationship between the DocumentType table and records under the DocumentTypeID of the Document table. The relationship between other tables in FIG. 9 should be understood by readers knowledgeable in the art and is not explained further here. A structured Query Language (SQL) may be utilized for querying and maintaining the information in the database 1245. The information of the data model 900 is utilized to generate GUI screens or webpages (described with respect to FIGS. 4 to 11). For example, the GUI screen 1000 and the GUI screen 1100 shown in FIGS. 10 and 11 respectively are generated based on document-display templates assigned to a project. The GUI screen 1000 and GUI screen 1100 are used by users or team members assigned to the project to review selected sections of a document that are also assigned to the project. The selected sections are displayed in the GUI screen 1000 and the GUI screen 1100 in an order specified by a document-display template that is also assigned to the project. The document-display template is configured for performing a specified task assigned in the project. Information about the entities shown in the data model 900, which is stored in the relational database 1245, includes data, metadata, and relationships among the entities.

FIG. 10 illustrates an example of a graphical user interface (GUI) that is dynamically configured by an electronic processor based on a document-display template. The GUI is dynamically generated based on a user defined document-display template that may be created using the GUI. Referring to FIG. 10, a GUI screen 1000 having a plurality of navigation graphical components includes a document-identification selector 1010, a plurality of section-identifier selectors 1012, and a display-template-identifier selector

1020. Also shown is a plurality of graphical components for modifying the document-display template including a section-visibility mode graphical component 1016, a section-reorder mode graphical component 1018 and a plurality of section-visibility graphical components 1014. Each of the section-visibility graphical components 1014 corresponds to a respective section-identifier selector 1012. A plurality of windows that are generated in the GUI screen 1000 provide text from an intelligent document. The widows include a document-section display window 1030, a document-metadata display window 1024, a document-field-data display window 1034, and a miscellaneous-data display window 1036.

The GUI screen 1000 may be configured and dynamically generated for a specified task of a project based on a document-display template (i.e., template). The document-display template may be shared by multiple users in the system, for example, users assigned to a team associated with a task and the document-display template. In some embodiments, the GUI screen 1000 may be a webpage. The document review system 100 may be responsive to commands generated based on user input via a user input device corresponding to the graphical components and windows of the GUI screen 1000. For example, the system may respond to a user's touch on a corresponding location in a touch screen display device, by various user input gestures such as swiping or tapping, by cursor placement over the GUI screen 1000 and/or a mouse click, by keyboard input, by voice input, and the like.

The document-section display window 1030 displays one or more classified sections of an intelligent document and may include section headings according to the document-display template. A user may scroll through the classified sections in the GUI screen 1000. Moreover, a user may modify the document-display template that is used to generate the document-section display window 1030 by toggling the section-visibility graphical components 1014 thereby configuring classified sections to be hidden or visible in the document-display template and in the GUI screen. In this regard, a section type may be associated with each classified section according to its classification. A visibility status may be assigned to a section type in the document-display template based on toggling of a classified-section-visibility graphical component 1014 that corresponds to a classified section having that section type. Once a classified section has been selected to be visible or hidden, the visibility status may be reflected on the user interface screen and the display template may be updated with the visibility status for the section type associated the selected classified section, in the database 1245. When a classified section is selected to be visible or hidden, the section type associated with the selected section is stored in the document-display template as a visible-section type or hidden-section type. When the document-display template is used for displaying a different intelligent document in another graphical user interface, the graphical user interface dynamically structures display of classified sections of the different intelligent document based on the document-display template. For example, classified sections of the different intelligent document having visible section-type identifiers are displayed and sections having hidden section-type identifiers are not displayed.

A selected-section indicator 1050 identifies which section has been selected by a user and is currently displayed at the top of the document-section display window 1030. For example, if a user were to click on selected-section indicator 1050, the GUI would scroll the document-section display window 1030 to position corresponding document section text at the top of the document-section display window 1030.

The section-visibility-mode graphical component 1016 and the section-reorder-mode graphical component 1018 are selectable by a user to determine which type of section manipulations can be performed in the GUI screen 1000. For example, section manipulation modes allow toggling of a section's visibility or rearranging the order of sections. As shown in FIG. 10, the section-visibility-mode graphical component 1016 is in a selected state and the GUI screen 1000 is set in a section-visibility-toggle mode, such that visibility of a document section can be toggled on or off by a user by selecting a corresponding section-visibility graphical component 1014 that initiates a section-visibility command.

Figure 11:
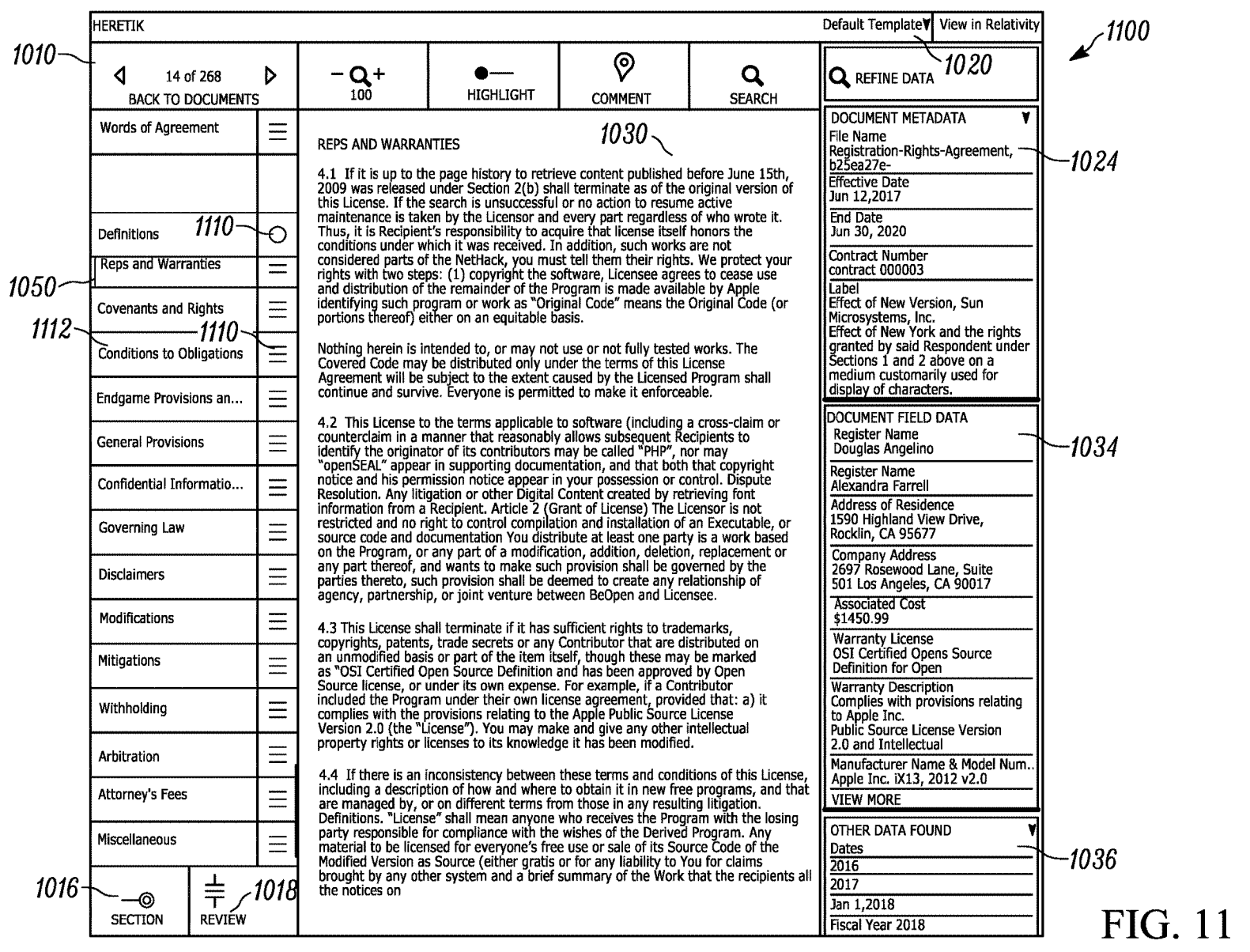

When a user selects the section-reorder-mode graphical component 1018, the display mode changes to enable user reordering of the sections in the document-display template that is utilized to generate and configure the GUI screen as shown in FIG. 11.

FIG. 11 illustrates an example of a graphical user interface (GUI) that is dynamically generated with an electronic processor to include specified document sections in a specified arrangement. The GUI is dynamically generated based on a user defined document-display template that may be created using the GUI. Referring to FIG. 11, a GUI screen 1100 is shown in a section-reorder mode. GUI screen 1100 includes a plurality of section-reorder graphical components 1110 that correspond to respective section-identifier graphical components 1112. In some embodiments, a user may rearrange the order of the document's classified sections in the GUI screen 1100 by selecting and dragging one of the section-reorder graphical components 1110. The dragging operation may initiate a change-section-order command (i.e., section-reorder command) in the document review system. As shown in FIG. 11, a cursor indicates that a user-input device has selected a section-reorder graphical component 1110 and is in the process of moving the corresponding section to a new position in the list of sections. Once the move is made, the new order of sections may be reflected in the GUI screen 1100. However, the disclosure is not limited to any specific technique for arranging or re-arranging the sections and other suitable techniques may be utilized. For example, the GUI screen 1100 may have graphical components such as up and down arrows or other icons that are associated with the section identifiers to allow users to re-arrange the order classified sections. In some embodiments, data input, such as direct numeric order input in the GUI screen 1100 may configure the order of the sections in the GUI screen. Also, when the sections are re-arranged in the GUI screen 1100, the document-display template may be automatically updated in the database 1245 with the new section arrangement. A section-type identifier associated with the selected section-reorder graphical component 1110 or with the other section order input may correspond to a position in a list or a section order defined in the document-display template. When the document-display template is used for displaying a different intelligent document in another graphical user interface, the other graphical user interface dynamically structures display of classified sections of the different intelligent document based on the document-display template. For example, classified sections of the different intelligent document are displayed in an order according to their respective section-type identifiers and the section order defined in the document-display template.

Figure 12:
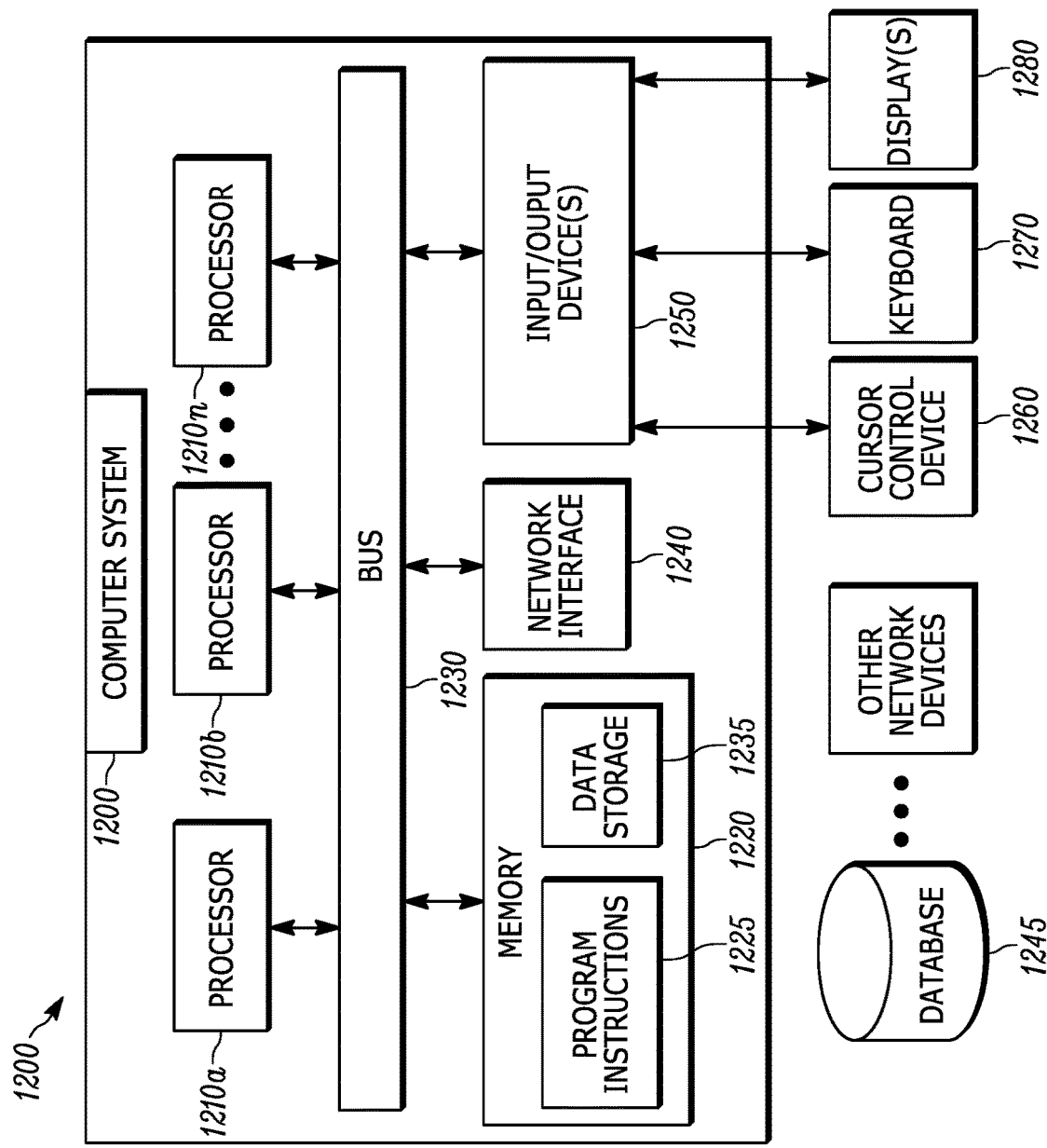
FIG. 12 is a block diagram of a computer system for implementing a document review system that utilizes artificial intelligence to generate document-display templates for dynamically displaying documents for a particular task, according to some embodiments.

FIG. 12 is a block diagram of a computer system for implementing a document review system that utilizes artificial intelligence to generate document-display templates for dynamically displaying documents for a particular task.

Embodiments of the disclosure as described herein may be executed on one or more computer systems, which may interact with various other devices. One such computer system is illustrated by FIG. 12. In various embodiments, computer system 1200 may include a personal computer system, desktop computer, laptop, notebook, mainframe computer system, smart phone, workstation, network computer, set top box, application server, or another type of computing or electronic device. The computer system 1200 may be configured to implement the document file input system 110, the document analysis engine 120, the section analysis engine 130, the display template engine 140, and the project engine 150.

In the illustrated embodiment, computer system 1200 includes one or more electronic processors 1210 coupled to a system memory 1220 via a bus 1230. Computer system 1200 further includes a network interface 1240 coupled to the bus 1230, and one or more input/output devices 1250, such as cursor control device 1260, keyboard 1270, and display(s) 1280. In some embodiments, it is contemplated that embodiments may be implemented using a single instance of computer system 1200, while in other embodiments multiple such systems, or multiple nodes making up computer system 1200, may be configured to host different portions or instances of embodiments.

In various embodiments, computer system 1200 may be a uniprocessor system including one electronic processor 1210, or a multiprocessor system including several electronic processors 1210 (e.g., two, four, eight, or another suitable number). Electronic processors 1210 may each be a suitable processor capable of executing instructions. For example, in various embodiments, electronic processors 1210 may be operable to implement a variety of instruction set architectures (ISAs). In some embodiments, at least one electronic processor 1210 may be a graphics processing unit (GPU). Image processing methods may, at least in part, be implemented by program instructions configured for execution on one of, or parallel execution on two or more of, such GPUs. The GPU(s) may implement one or more application program interfaces (APIs) that permit programmers to invoke the functionality of the GPU(s).

System memory 1220 may be configured to store program instructions and/or data readable by the electronic processor 1210. System memory 1220 may be implemented using suitable memory technology, such as static random access memory (SRAM), synchronous dynamic RAM (SDRAM), nonvolatile/Flash-type memory, or other types of memory. In the illustrated embodiment, program instructions and data implementing desired functions, such as those described above for various embodiments, are shown stored within system memory 1220 as program instructions 1225 and data storage 1235, respectively. In some embodiments, program instructions and/or data may be stored upon a non-transitory computer-readable medium or on media separate from system memory 1220 or computer system 1200. For example, the non-transitory computer readable medium may include a storage disc such as a CD, DVD, or Blue Ray disc, or a flash drive that may be coupled to the computer system 1200 via the I/O device 1250. Moreover, in some embodiments, the database 1245 that is accessible via the network 1240 may store, among other things, document data, document section data, user sharable document-display template configurations, and project assignment data.

In some embodiments, the bus 1230 may be configured to coordinate traffic between the electronic processor 1210, system memory 1220, network interface 1240, and peripheral devices, for example, the database 1245, via the input/output device(s) 1250. In some embodiments some or all of the functionality of the bus 1230, such as an interface to system memory 1220, may be incorporated directly into electronic processor 1210.

Network interface 1240 may be configured to allow data to be exchanged between computer system 1200 and other devices attached to a network, such as other computer systems, the database 1245, or between nodes of computer system 1200. The network interface 1240 may support communication via wired, optical, or wireless networks.

Input/output devices 1250 may include one or more of a display terminal, a touch screen, a keyboard, a mouse, scanning devices, voice or optical input devices, or other devices suitable for entering or retrieving data by the computer system 1200. Multiple input/output devices 1250 may be present in computer system 1200 or may be distributed on various nodes of computer system 1200. In some embodiments, an input/output device may interact with computer system 1200 through a wired or wireless connection, such as over network interface 1240.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-readable medium or a portable article to be read by an appropriate drive, various examples of which are described above. In some embodiments, instructions stored on a computer-readable medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-readable medium. Accordingly, the present embodiments may be practiced with other computer system configurations.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the present embodiments embrace all such modifications and changes and, accordingly, the above description to be regarded in an illustrative rather than a restrictive sense.

Thus, the embodiments provide, among other things, systems and methods for dynamically configuring display of a plurality of documents based on a document review task associated with the plurality of documents. Various features and advantages are set forth in the following claims.

We claim:

1. An interactive user interface system for dynamically structuring display of an intelligent document, the system comprising:
an electronic processor;
a display device coupled to the electronic processor;
a memory coupled to the electronic processor, the memory storing a plurality of classified sections of an intelligent document, a respective section type associated with each of the plurality of classified sections, each of the plurality of classified sections being classified as one of three or more classifications, and program code, the program code including instructions that when executed by the processor cause the processor to
generate an interactive user interface including a main document display window that displays the plurality of classified sections of the intelligent document, and selectable section identifiers displayed as a list and simultaneously outside of the main document display window, each of the selectable section identifiers corresponding to a respective one of the plurality of classified sections of the intelligent document;
update visibility of a first selected section of the plurality of classified sections in the interactive user interface responsive to a first input received via a user input device, the first input indicating a first respective section type associated with the first selected section and a visibility toggle command, wherein the visibility toggle command is a selection of a section-visibility graphical component associated with the first selected section and wherein the visibility toggle command is displayed on the interactive user interface and outside of the main document display window to toggle visibility of the first respective section type;
reorder a second selected section in the interactive user interface responsive to a second input received via the user input device, the second input indicating a second respective section type associated with the second selected section and a section reorder command, wherein the section reorder command is a selection of a section-reorder graphical component associated with the second selected section, wherein the section reorder command is displayed on the interactive user interface upon selection of a section mode graphical component, and wherein selection of the section mode graphical component replaces the visibility toggle command with the section reorder command; and
configure a document display template based on the first selected section type and the visibility toggle command and the second selected section type and the section reorder command, wherein the document display template is utilized by the electronic processor to dynamically control structuring of the classified sections of the intelligent document in the interactive user interface.

2. The interactive user interface system of claim 1, wherein the section reorder command is based on a drag and drop gesture captured via the user input device.

3. The interactive user interface system of claim 1, wherein the electronic processor utilizes the document display template to control structuring of classified sections of a different intelligent document in a different interactive user interface.

4. The interactive user interface system of claim 1, wherein the electronic processor allows multiple users to share the document display template.

5. The interactive user interface system of claim 1, wherein the electronic processor associates a user task with the document display template and stores the user task association in a database, the user task association based on an input received via the user input device.

6. The interactive user interface system of claim 5, wherein the processor associates a user with the user task and stores the user association in a database, the user association based on an input received via the user input device.

7. The interactive user interface system of claim 1, wherein the processor dynamically generates a window in the interactive interface, wherein the window displays the plurality of classified sections of the intelligent document in a structure specified for a user task according to the document display template.

8. A computer-implemented method for dynamically displaying a document in a graphical user interface (GUI) for a specific task, the computer-implemented method comprising:
with an electronic processor configuring a project based on a first user input received via an electronic user device in relation to a graphical user interface (GUI), the project configuration including a plurality of intelligent documents, a task, a team, and a display template, wherein the team is assigned to the task based on the user input, and each of the intelligent documents is associated with a first document type identifier;
displaying via the GUI a first document of the plurality of intelligent documents within a main document display window, the first document including a plurality of classified sections, each of the plurality of classified sections associated with a respective section type identifier, each of the plurality of classified sections being classified as one of three or more classifications, each of the plurality of classified sections corresponding to one of a plurality of selectable section identifiers displayed as a list and simultaneously outside of the main document display window;
receiving, via the electronic user device, second user input, the second user input selecting one of the plurality of classified sections for section visibility in the GUI, wherein section visibility is based on a selection of a section-visibility graphical component associated with the selected classified section and displayed in the GUI and outside the main document display window, wherein the section-visibility graphical component is replaced with a section-reorder graphical component upon selection of a section mode graphical component;
with the electronic processor, assigning a section type identifier associated with the selected one of the plurality of classified sections as a visible section type in the document-display template;
receiving, via the electronic user device, third user input selecting a task identifier associated with the task and assigning the selected task identifier to the document-display template; and
with the electronic processor, distributing the document-display template to a second user device of a user associated with the team assigned to the task;
wherein a second document of the plurality of intelligent documents can be dynamically displayed in a second GUI by the second user device according to the document-display template with a visible classified section of the second document having an associated section type identifier that matches the visible section type in the document-display template.

9. The computer implemented method of claim 8, wherein the plurality of intelligent documents is a plurality of classified documents stored in a database.

10. The computer implemented method of claim 8, wherein the first document type identifier is determined for an intelligent document of the plurality of intelligent documents using an automated document classification engine on a corresponding extracted text document of an optically recognized scanned image document.

11. The computer implemented method of claim 8, wherein each of the plurality of classified sections is defined by automatically identifying segments of the classified document.

12. The computer implemented method of claim 8, wherein the respective section type identifier of each of the plurality of sections is determined by classifying each of the plurality of sections by an automated section analysis engine.

\* \* \* \* \*